Jan. 29, 1957 J. L. WILSON ET AL 2,779,510
VIBRATIONAL DISPENSER FOR FORMING SOLID GAS MIXTURES
Filed Sept. 27, 1954
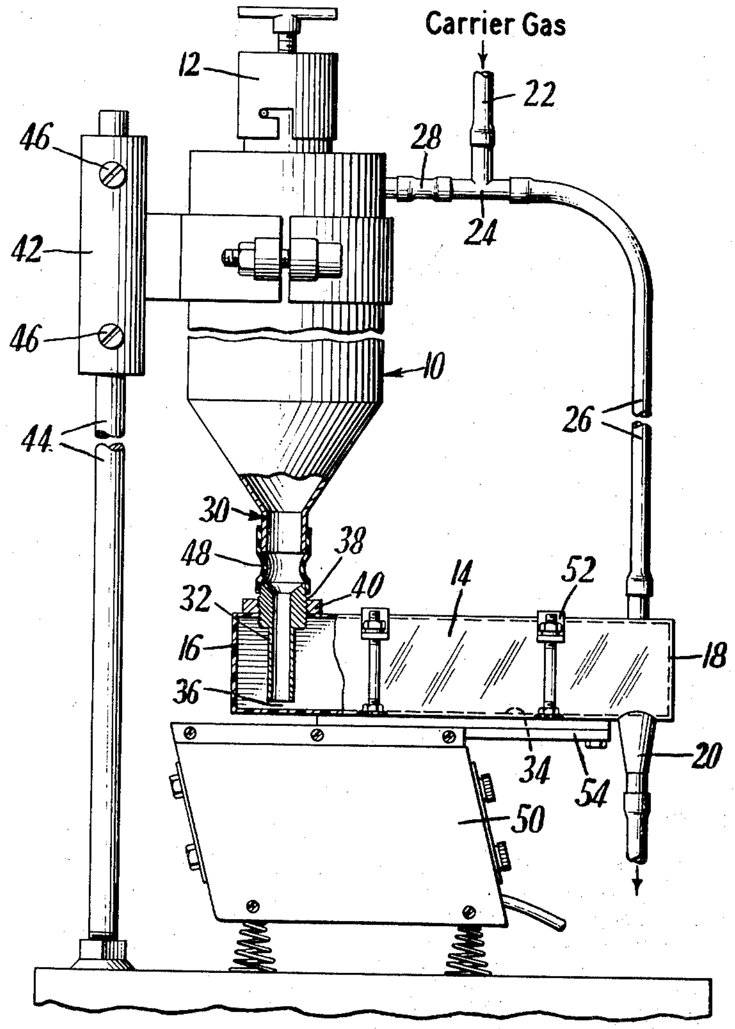
INVENTORS
JACK L. WILSON
ALBERT M. GONAS
BY Gerald R. O'Brien Jr.
ATTORNEY United States Patent Office 2,779,510

Patented Jan. 29, 1957

2,779,510

VIBRATIONAL DISPENSER FOR FORMING SOLID GAS MIXTURES

Jack L. Wilson and Albert M. Gonas, Niagara Falls, N. Y., assignors to Union Carbide and Carbon Corporation, a corporation of New York Application September 27, 1954, Serial No. 458,325

12 Claims. (Cl. 222—193)

This invention relates to improved apparatus for delivering powdered or otherwise finely divided solid material to a carrier gas stream by vibrational means at a predetermined and uniform rate.

In various metallurgical processes, it is necessary that powdered, or otherwise finely divided, solid material be conveyed to a reaction zone by a carrier gas. For example, in a recently-developed process of shielded inert gas metal arc welding, wherein the welding zone is shielded by an inert gas, such as helium, argon and the like, a welding composition is introduced with the shielding gas stream by a powder dispensing apparatus and carried into the arc zone and fused with the weld metal to obtain beneficial shielding and fluxing results. The introduction of this finely divided solid material into the carrier gas stream is, however, in many instances, unevenly proportioned so that over a given period, more material is fed at one moment than another, thus destroying the uniformity with which the welding zone is fluxed. This non-uniform distribution of powdered material may, at times, clog up carrier tubes to an extent that it is necessary to discontinue operations until such tubes are cleaned or replaced.

Heretofore, dispensing apparatus of this type consisted primarily of a conveying element associated at one end with a material hopper and at the other end with an exit conduit. The flow of material along the conveying element was attained by actuating with a magnetic vibrator or similar means. The rate of powder flow from the dispensing apparatus was controlled by such means as varying the slip angle of the powdered material or by adjusting the frequency of vibration impressed upon the conveying element. The slip angle of the powdered material was varied by changing the inclination of this conveying element in a vertical plane with respect to the horizontal, or by altering the vibration axis orientation.

The powdered material in such prior apparatus followed a path down through the hopper to the conveying element and was carried by vibrational means to the exit conduit. The flow of material from the hopper was generally accomplished by either of two means; vibration of the material hopper simultaneously with the conveying element or solely by gravitational means. The former means, having the hopper rigidly attached to the conveying element, introduced variations in amplitude of vibration dependent upon the amount of material in the hopper; the latter means often resulted in clogging in the absence of a vibrating source, thereby preventing an evenly distributed flow of powdered material.

As an alternate means for vibration, a separate vibrating source was attached to the material hopper to prevent the clogging action introduced by gravitational flow alone, or by the flow of coarse materials, but this necessitated a separate vibration-governing device in addition to that controlling the vibration of the conveying element.

It is, therefore, an object of the present invention to provide apparatus for simultaneously forming a mixture of gas and a powdered, or otherwise finely divided, solid material so as to deliver the material at a constant, reproducible and closely controlled rate, whereby powdered materials can be successfully dispensed over a range of powder flow rates ranging from a very small rate to a very large rate, whereby the rate of powdered dispensing is independent of the rate of gas flow, and whereby powdered materials of different types and particle sizes can be successfully dispensed.

It is another object of the present invention to provide improved means for controlling the material flow from the hopper to the conveying element of the dispensing apparatus to assure a more uniformly distributed flow with a smaller percentage of error in feeding rates than heretofore obtained.

It is a further object of the present invention to provide means associated with the hopper and conveying element of the apparatus whereby a major amount of the vibrational energy impressed upon the conveying element is absorbed and only a component of this vibrational energy is transmitted to the hopper to assist the material flow, thereby eliminating the need for a separate vibrating source associated with the material hopper, and the need for altering the degree of vibration of the hopper as the amount of material within the hopper changes.

It is a still further object of the present invention to provide means for visually inspecting the amount of material being conveyed through the dispenser, thereby insuring against the ever-present possibility of clogging and breakdown.

In accordance with the present invention, a gas-tight material dispenser is provided which depends upon a vibrating action to convey the solid material to the carrier gas stream. In order to more fully describe the apparatus of the invention, reference is made to the single figure of the drawing which schematically shows apparatus embodying the invention.

Closed material hopper 10 is provided for holding the powdered, or otherwise finely divided, solid material, for example, a granulated welding composition, and sealing cap 12 is employed to make hopper 10 pressure-tight. Transfer chamber 14, having first end 16 and second end 18, conveys the powder material, deposited at first end 16 to outlet conduit means 20 associated with second end 18 of transfer chamber 14.

Main gas inlet means 22 is provided to direct the flow of carrier gas, which may be any gas inert to the solid material, such as argon, helium, carbon monoxide, carbon dioxide and the like, under pressure to the dispensing apparatus through T-joint 24. First gas inlet means 26, associated with T-joint 24 and second end 18 of transfer chamber 14, introduces a major portion of the gas into transfer chamber 14 for there forming the solid-gas mixture. Second gas inlet means 28, associated with T-joint 24 is employed to introduce a portion of the gas into hopper 10 in order to equalize the pressure within the hopper member with other gas-tight internal portions of the dispenser to insure the vibrational-gravitational flow of material into the transfer chamber 14 and to prevent against back up and clogging of the material within the hopper 10 due to back pressure within the hopper member.

Delivery conduit means 30, communicating gas-tightly between hopper 10 and first end 16 of transfer chamber 14, is provided for supplying the powdered material from hopper 10 to transfer chamber 14. An important feature of delivery conduit means 30 is powder flow control pipe means 32, extending into transfer chamber 14 to an adjustable height above floor 34 of transfer chamber 14. Vertical spacing 36 between powder flow control pipe means 32 and floor 34 of transfer chamber 14 is provided to control the flow of the powdered material from hopper 10 by varying the height of powder flow control pipe means 32.

The adustment of vertical spacing 36 is accomplished by providing threads 38 on powder flow control pipe means 32, whereby it may be secured at the desired position with lock nut 40 to prevent loosening by vibration. As an alternate means for adustment of the height of powder flow control pipe means 32 and vertical spacing 36, slide housing 42 can be raised or lowered to the desired height on the vertical stand rod 44 and held in position by set screws 46. Either of these or similar procedures may be employed for adjusting vertical spacing 36 to control the flow of powdered material from hopper 10 to transfer chamber 14.

Delivery conduit means 30 is also provided with vibration dampener coupling 48, which may be composed of rubber or a similar resilient material which will attenuate the amplitude of vibrations transmitted to hopper 10. The vibrational amplitude impressed upon transfer chamber 14 and powder flow control pipe means 32 is to a great extent absorbed by vibrational dampener coupling 48. However, a component amplitude, which will vary as the quantity of the contents within the hopper changes, is allowed to pass into hopper 10. This eliminates the need for a separate vibrating source attached to material hopper 10 and assures a uniformly distributed flow, freer from clogging. Since the material hopper 10 is vibrated by only a component of the amplitude impressed upon the transfer chamber 14, it is not subject to a varying degree of vibration.

Transfer chamber 14 is secured to magnetic vibrator 50 through clamp means 52 and platform 54. The impressed vibration of the instrument, at controlled frequencies, carries the powdered material, deposited by delivery conduit means 30 at first end 16 of transfer chamber 14, across floor 34 of transfer chamber 14 to second end 18 where mixing with the carrier gas stream occurs to produce a solid-gas mixture, which is passed from the dispenser through outlet conduit means 20.

It has been found preferable to construct transfer chamber 14 of transparent material, thereby enabling a continuous visual inspection of the amount of material being conveyed through the dispenser to the carrier gas stream. The possibility of carrying a greater or lesser than desired quantity of material through the tubes is always present due to possible faulty adjustment of apparatus and the like. Since this might cause clogging of the exit tubes and necessitate a complete stoppage of operations, visual inspection is very desirable.

A material dispenser embodying the invention was employed in a welding application to dispense a crushed welding composition approximately 20 x 200 mesh. The welding composition was fed from the hopped through the exit conduit means 20 at a considerable number of closely controlled rates within the range of from approximately 0.5 to 250 grams per minute. For the minimum flow rate, vertical spacing 36 between powder flow control pipe means 32 and floor 34 of transfer chamber 14 was as little as 1/16 of an inch. The error in feeding rates was carefully measured and found to vary from less than approximately 2% at 30 grams per minute to less than 1.5% at 250 grams per minute. The evenness of flow of the carrier gas-powdered material mixture contributed greatly to the quality of the resultant weld. At no time was the operation stopped due to clogging of the lead pipes. It has been found preferable that the powdered material, when used as a welding composition, be of mesh size no larger than 8 x D.

Powder dispensers constructed in accordance with the present invention have been found to operate successfully with many different powdered, or otherwise finely divided, solid materials; have been found capable of dispensing powdered materials at constant, reproducible and controlled rates, within the range of from approximately 0.5 to over 250 grams per minute, which are substantially independent of gas flow rates; have been found capable of dispensing powdered material having feed rates within less than 2% error; and are simple in construction, dependable in operation, and economical to construct and maintain.

What is claimed is:

1. A vibrational gas-tight powder dispenser for forming solid-gas mixtures comprising, in combination, a closed material hopper; a closed transfer chamber having first and second ends; delivery conduit means communicating gas-tightly between said hopper and said first end of said transfer chamber for supplying powdered material from said hopper to said transfer chamber, said delivery conduit means containing powder flow control pipe means extending into said transfer chamber to a regulated height above the floor of said transfer chamber, whereby the rate of flow of said powdered material to said transfer chamber is controlled; first gas inlet means associated with said second end of said transfer chamber for supplying gas to there form said solid-gas mixture; second gas inlet means associated with said hopper for supplying gas to maintain a pressure therein sufficient to equalize the pressure within said transfer chamber for preventing back up and clogging of said powdered material within said hopper; means for vibrating said transfer chamber so as to pass powdered material along said floor of said transfer chamber from said first end to said second end; and outlet conduit means associated with said second end of said transfer chamber for conveying said solid-gas mixture from said dispenser.

2. A vibrational gas-tight powder dispenser for forming solid-gas mixtures in accordance with claim 1, also comprising means for adjusting said powder flow control pipe means to a variable height above said floor of said transfer chamber, whereby the flow of said powdered material to said transfer chamber is controlled.

3. A vibrational gas-tight powder dispenser for forming solid-gas mixtures comprising, in combination, a closed material hopper; a closed transfer chamber having first and second ends; delivery conduit means communicating gas tightly between said hopper and said first end of said transfer chamber for supplying powdered material from said hopper to said transfer chamber, said delivery conduit means containing vibration dampener coupling means communicating gas-tightly between said hopper and said powder flow control pipe means for dampening vibrations of said transfer chamber transmitted to said hopper, whereby only a component of said vibration is transmitted to said hopper for conducing the flow of said powdered material to said transfer chamber; first gas inlet means associated with said second end of said transfer chamber for supplying gas to there form said solid-gas mixture; second gas inlet means associated with said hopper for supplying gas to maintain a pressure therein sufficient to equalize the pressure within said transfer chamber for preventing back up and clogging of said powdered material within said hopper; means for vibrating said transfer chamber so as to pass said powdered material along said floor of said transfer chamber from said first end to said second end; and outlet conduit means associated with said second end of said transfer chamber for conveying said solid-gas mixture from said dispenser.

4. A vibrational gas-tight powder dispenser for forming solid-gas mixtures comprising, in combination, a closed material hopper; a closed transfer chamber having first and second ends; delivery conduit means communicating gas-tightly between said hopper and said first end of said transfer chamber for supplying powdered material from said hopper to said transfer chamber; first gas inlet means associated with said second end of said transfer chamber for supplying gas to there form said solid-gas mixture; second gas inlet means associated with said hopper for supplying gas to maintain a pressure therein sufficient to equalize the pressure within said transfer chamber for preventing back up and clogging of said powdered material within said hopper; means for vibrating said transfer chamber so as to pass said powdered material along said floor of said transfer chamber from said first end to said second end; and outlet conduit means associated with said second end of said transfer chamber for conveying said solid-gas mixture from said dispenser; said transfer chamber being constructed of transparent material to permit visual inspection of the rate of feed of said powdered material passing through said transfer chamber to said gas.

5. A vibrational gas-tight powder dispenser for forming solid-gas mixtures comprising, in combination, a closed material hopper; a closed transfer chamber having first and second ends; delivery conduit means communicating gas-tightly between said hopper and said first end of said transfer chamber for supplying powdered material from said hopper to said transfer chamber, said delivery conduit means containing powder flow control pipe means extending into said transfer chamber to a regulated height above the floor of said transfer chamber, whereby the rate of flow of said powdered material to said transfer chamber is controlled; first gas inlet means associated with said second end of said transfer chamber for supplying gas to there form said solid-gas mixture; second gas inlet means associated with said hopper for supplying gas to maintain a pressure therein sufficient to equalize the pressure within said transfer chamber for preventing back up and clogging of said powdered material within said hopper; means for vibrating said transfer chamber so as to pass said powdered material along said floor of said transfer chamber from said first end to said second end; and outlet conduit means associated with said second end of said transfer chamber for conveying said solid-gas mixture from said dispenser; said transfer chamber being constructed of transparent material to permit visual inspection of the rate of feed of said powdered material passing through said transfer chamber to said gas.

6. A vibrational gas-tight powder dispenser for forming solid-gas mixtures in accordance with claim 5, also comprising means for adjusting said powder flow control pipe means to a variable height above said floor of said transfer chamber, whereby the flow of said powdered material to said transfer chamber is controlled.

7. A vibrational gas-tight powder dispenser for forming solid-gas mixtures comprising, in combination, a closed material hopper; a closed transfer chamber having first and second ends; delivery conduit means communicating gas-tightly between said hopper and said first end of said transfer chamber for supplying powdered material from said hopper to said transfer chamber, said delivery conduit means containing powder flow control pipe means extending into said transfer chamber to a regulated height above the floor of said transfer chamber, whereby the rate of flow of said powdered material to said transfer chamber is controlled, said delivery conduit means containing vibration dampener coupling means communicating gas-tightly between said hopper and said powder flow control pipe means for dampening vibration of said transfer chamber transmitted to said hopper, whereby only a component of said vibration is transmitted to said hopper for conducing the flow of said powdered material to said transfer chamber; first gas inlet means associated with said second end of said transfer chamber for supplying gas to there form said solid-gas mixture; second gas inlet means associated with said hopper for supplying gas to maintain a pressure therein sufficient to equalize the pressure within said transfer chamber for preventing back up and clogging of said powdered material within said hopper; means for vibrating said transfer chamber so as to pass said powdered material along said floor of said transfer chamber from said first end to said second end; and outlet conduit means associated with said second end of said transfer chamber for conveying said solid-gas mixture from said dispenser.

8. A vibrational gas-tight powder dispenser for forming solid-gas mixtures in accordance with claim 7, also comprising means for adjusting said powder flow control pipe means to a variable height above said floor of said transfer chamber, whereby the flow of said powdered material to said transfer chamber is controlled.

9. A vibrational gas-tight powder dispenser for forming solid-gas mixtures comprising, in combination, a closed material hopper; a closed transfer chamber having first and second ends; delivery conduit means communicating gas-tightly between said hopper and said first end of said transfer chamber for supplying powdered material from said hopper to said transfer chamber, said delivery conduit means containing vibration dampener coupling means communicating gas-tightly between said hopper and said powder flow control pipe means for dampening vibrations of said transfer chamber transmitted to said hopper, whereby only a component of said vibration is transmitted to said hopper for conducing the flow of said powdered material to said transfer chamber; first gas inlet means associated with said second end of said transfer chamber for supplying gas to there form said solid-gas mixture; second gas inlet means associated with said hopper for supplying gas to maintain a pressure therein sufficient to equalize the pressure within said transfer chamber for preventing back up and clogging of said powdered material within said hopper; means for vibrating said transfer chamber so as to pass said powdered material along said floor of said transfer chamber from said first end to said second end; and outlet conduit means associated with said second end of said transfer chamber for conveying said solid-gas mixture from said dispenser; said transfer chamber being constructed of transparent material to permit visual inspection of the rate of feed of said powdered material passing through said transfer chamber to said gas.

10. A vibrational gas-tight powder dispenser for forming solid-gas mixtures comprising, in combiantion, a closed material hopper; a closed transfer chamber having first and second ends; delivery conduit means communicating gas-tightly between said hopper and said first end of said transfer chamber for supplying powdered material from said hopper to said transfer chamber, said delivery conduit means containing powder flow control pipe means extending into said transfer chamber to a regulated height above the floor of said transfer chamber, whereby the rate of flow of said powdered material to said transfer chamber is controlled, said delivery conduit means containing vibration dampener coupling means communicating gas-tightly between said hopper and said powder flow control pipe means for dampening vibration of said transfer chamber transmitted to said hopper, whereby only a component of said vibration is transmitted to said hopper for conducing the flow of said powdered material to said transfer chamber; first gas inlet means associated with said second end of said transfer chamber for supplying gas to there form said solid-gas mixture; second gas inlet means associated with said hopper for supplying gas to maintain a pressure therein sufficient to equalize the pressure within said transfer chamber for preventing back up and clogging of said powdered material within said hopper; means for vibrating said transfer chamber so as to pass said powdered material along said floor of said transfer chamber from said first end to said second end; and outlet conduit means associated with said second end of said transfer chamber for conveying said solid-gas mixture from said dispenser; said transfer chamber being constructed of transparent material to permit visual inspection of the rate of feed of said powdered material passing through said transfer chamber to said gas.

11. A vibrational gas-tight powder dispenser for forming solid-gas mixtures comprising, in combination, a closed material hopper; a closed transfer chamber having first and second ends; delivery conduit means communicating gas-tightly between said hopper and said first end of said transfer chamber for supplying powdered material from said hopper to said transfer chamber, said delivery conduit means containing powder flow control pipe means extending into said transfer chamber to a regulated height above the floor of said transfer chamber, whereby the rate of flow of said powdered material to said transfer chamber is controlled; first gas inlet means associated with said second end of said transfer chamber for supplying gas to there form said solid-gas mixture; second gas inlet means associated with said hopper for supplying gas to maintain a pressure therein sufficient to equalize the pressure within said transfer chamber for preventing back up and clogging of said powdered material within said hopper; main gas inlet means associated with said first gas inlet means and said second gas inlet means for supplying thereto gas under pressure; means for vibrating said transfer chamber so as to pass said powdered material along said floor of said transfer chamber from said first end to said second end; and outlet conduit means associated with said second end of said transfer chamber for conveying said solid-gas mixture from said dispenser.

12. A vibrational gas-tight powder dispenser for forming solid-gas mixtures in accordance with claim 11, also comprising means for adjusting said powder flow control pipe means to a variable height above said floor of said transfer chamber, whereby the flow of said powdered material to said transfer chamber is controlled.

References Cited in the file of this patent

UNITED STATES PATENTS

| | | |
|---|---|---|
| 1,323,633 | Weber | Dec. 2, 1919 |
| 2,077,898 | Rolff | Apr. 20, 1937 |
| 2,187,717 | Weyandt | Jan. 23, 1940 |
| 2,568,332 | Genovese | Sept. 18, 1951 |